United States Patent
Kondo et al.

(10) Patent No.: US 12,101,050 B2
(45) Date of Patent: Sep. 24, 2024

(54) COOLING CONTROL DEVICE

(71) Applicant: DENSO CORPORATION, Kariya (JP)

(72) Inventors: Haruhiko Kondo, Kariya (JP); Kousuke Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 209 days.

(21) Appl. No.: 17/731,813

(22) Filed: Apr. 28, 2022

(65) Prior Publication Data

US 2022/0255491 A1  Aug. 11, 2022

Related U.S. Application Data

(63) Continuation of application No. PCT/JP2020/040325, filed on Oct. 27, 2020.

(30) Foreign Application Priority Data

Oct. 29, 2019 (JP) .................................. 2019-196041
Jun. 11, 2020 (JP) .................................. 2020-101435

(51) Int. Cl.
  *H02P 29/68* (2016.01)
  *B60K 11/04* (2006.01)
  *B60L 15/20* (2006.01)
  *B60L 53/22* (2019.01)
  *H02P 27/06* (2006.01)

(52) U.S. Cl.
  CPC .............. *H02P 29/68* (2016.02); *B60K 11/04* (2013.01); *B60L 15/20* (2013.01); *B60L 53/22* (2019.02); *H02P 27/06* (2013.01); *B60L 2210/10* (2013.01)

(58) Field of Classification Search
  CPC .. H02P 29/68; H02P 27/06; B60L 1/02; B60L 1/003; B60L 53/22; B60L 15/20; B60L 2240/425; B60L 2250/26; B60L 2210/10; B60L 2240/12; B60L 2240/525; B60K 11/02; B60K 11/04; B60K 2001/006; H02M 7/48; B60W 10/30
  See application file for complete search history.

(56) References Cited

U.S. PATENT DOCUMENTS

| | | | |
|---|---|---|---|
| 2010/0050676 A1* | 3/2010 | Takamatsu | B60K 11/02 62/259.2 |
| 2013/0060409 A1* | 3/2013 | Matsushita | B60W 10/184 180/65.23 |
| 2016/0159246 A1* | 6/2016 | Jung | B60H 1/00764 62/243 |

FOREIGN PATENT DOCUMENTS

| | | |
|---|---|---|
| JP | 2013-225978 A | 10/2013 |
| JP | 2014-147193 A | 8/2014 |
| JP | 2016-123173 A | 7/2016 |

* cited by examiner

*Primary Examiner* — Said Bouziane
(74) *Attorney, Agent, or Firm* — Oliff PLC

(57) ABSTRACT

A cooling control device has an inverter control unit that executes switching control of an inverter for driving a rotary electric machine, and a cooling control unit. On condition that the switching control is stopped, if it is judged that a control temperature is below a threshold value thereof, the cooling control unit executes driving and control of a cooling device such as to lower a degree of cooling of a cooling target component below the degree of cooling when it is judged that the control temperature is above the threshold value. The cooling target component is composed of at least one of the rotary electric machine and the inverter. The control temperature is either a detected temperature value of the cooling target component or an estimated temperature value from a temperature estimation unit that estimates the temperature of the cooling target component.

9 Claims, 9 Drawing Sheets

COOLING CONTROL DEVICE

CROSS-REFERENCE TO RELATED APPLICATION

The present application is a continuation application of International Application No. PCT/JP2020/040325, filed on Oct. 27, 2020, which claims priority to Japanese Patent Application No. 2019-196041, filed on Oct. 29, 2019, and Japanese Patent Application No. 2020-101435 filed on Jun. 11, 2020. The contents of these applications are incorporated herein by reference in their entirety.

BACKGROUND

1. Technical Field

The present disclosure relates to a cooling control device.

2. Related Art

Systems are known that includes an inverter, a rotary electric machine electrically connected to the inverter, a cooling device for cooling the inverter and the rotary electric machine as cooling target components, and a control unit for controlling the cooling device. In such a system, an electric water pump for circulating cooling water in a circulation path is provided as the cooling device.

SUMMARY

The present disclosure provides a cooling control device. As an aspect of the present disclosure, a cooling control device is a device applicable to a system that has an inverter, a rotary electric machine electrically connected to the inverter, and a cooling device for cooling a cooling target component that is either or both of an inverter and a rotary electric machine. The device includes an inverter control unit that executes switching control of the inverter for driving the rotary electric machine, and a cooling control unit. On condition that the switching control by the inverter control unit is stopped, if it is judged that a control temperature has fallen below a threshold value thereof, where the control temperature is either a detection value obtained by a temperature sensor that detects a temperature of the cooling target component or an estimated value obtained by a temperature estimation unit that estimates the temperature of the cooling target component, the cooling control unit executes driving and control of the cooling device such as to lower a degree of cooling of the cooling target component by the cooling device below the degree of cooling when it is judged that the control temperature is above the threshold value.

BRIEF DESCRIPTION OF THE DRAWINGS

The above objectives and other objectives, features and advantages of the present disclosure will be further clarified by the following detailed description, given with reference to the accompanying drawings. In the drawings.

DETAILED DESCRIPTION OF THE PREFERRED EMBODIMENTS

Figure 1:
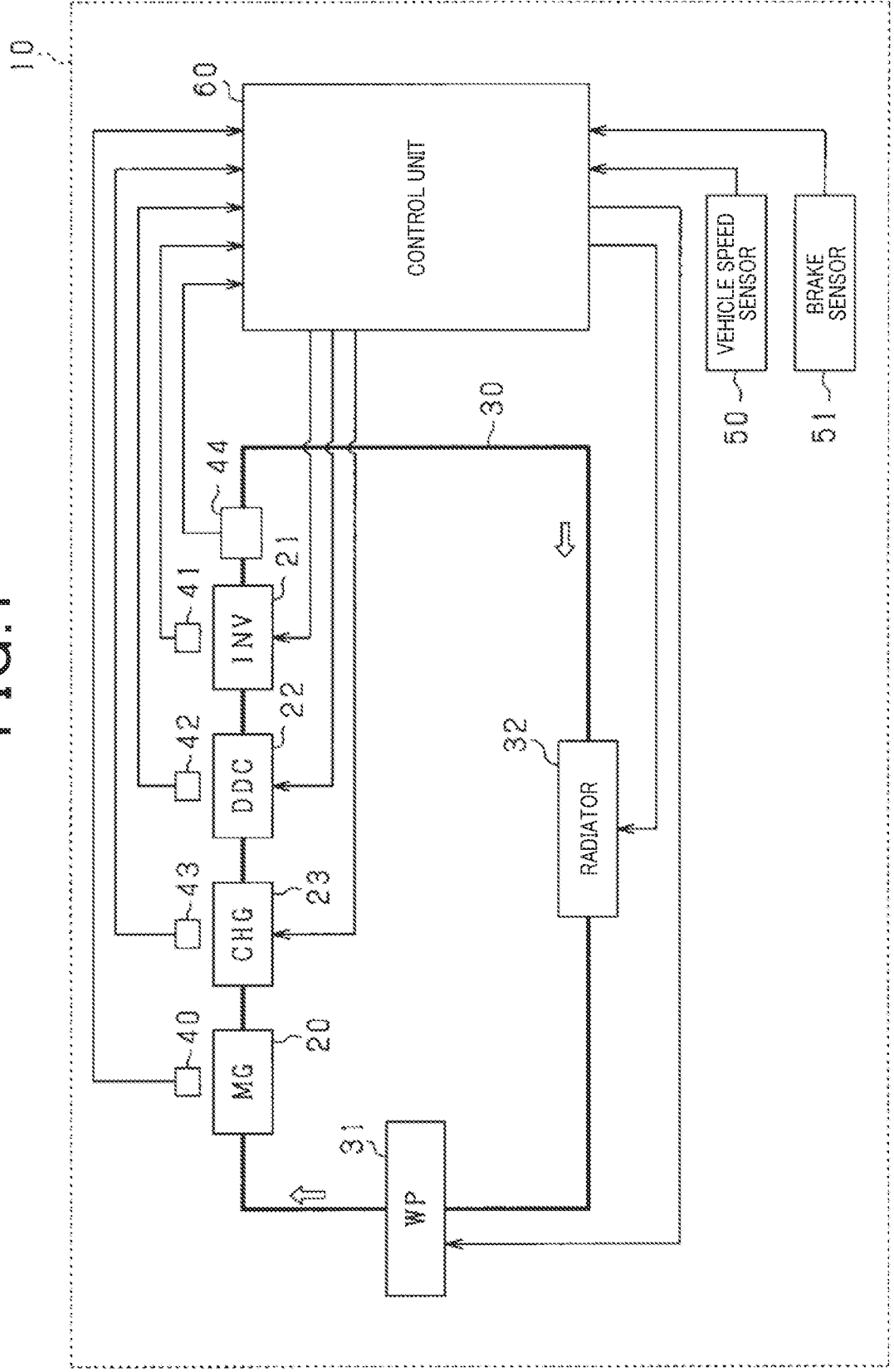
FIG. 1 is an overall configuration diagram of an in-vehicle system according to a first embodiment.

As described in JP 2014-147193 A (Japanese Unexamined Patent Publication No. 2014-147193), systems are known that includes an inverter, a rotary electric machine electrically connected to the inverter, a cooling device for cooling the inverter and the rotary electric machine as cooling target components, and a control unit for controlling the cooling device. In such a system, an electric water pump for circulating cooling water in a circulation path is provided as the cooling device.

The control unit sets a prescribed threshold value such that the higher becomes the detection value from a temperature sensor that detects the temperature of the rotary electric machine, the lower becomes the threshold value. The control unit drives the water pump to circulate the cooling water only when it is judged that the detection value from a current sensor that detects the current flowing through the rotary electric machine is higher than the threshold. value. In that way, the power consumption of the water pump can be reduced, while preventing overheating of the components that are to be cooled.

The detection error of the current sensor is generally large. Hence, in a configuration in which the decision as to whether to drive the water pump is made based on a comparison between the detection value from the current sensor and the threshold value, there is a concern that the cooling target components may become cooled to an excessive extent, or insufficiently cooled. If the cooling is insufficient, the control target components will become overheated, the reliability of the control target components may be lowered. Hence it is considered that there remains room for improvement in this technology, with respect to reducing the power consumption of the cooling device while preventing overheating of the components that are to be cooled.

One or more aspects of the present disclosure are directed to provide a cooling control device capable of reducing the power consumption of the cooling device while preventing overheating of the components that are to be cooled.

According to an aspect of the present disclosure, a cooling control device is a device applicable to a system that has an inverter, a rotary electric machine electrically connected to the inverter, and a cooling device for cooling a cooling target component that is either or both of an inverter and a. rotary electric machine. The device includes an inverter control unit that executes switching control of the inverter for driving the rotary electric machine, and a cooling control unit. On condition that the switching control by the inverter control unit is stopped, if it is judged that a control temperature has fallen below a threshold value thereof, where the control temperature is either a detection value obtained by a temperature sensor that detects a temperature of the cooling target component or an estimated value obtained by a temperature estimation unit that estimates the temperature of the cooling; target component, the cooling control unit executes driving and control of the cooling device such as to lower a degree of cooling of the cooling target component by the cooling device below the degree of cooling when it is judged that the control temperature is above the threshold value.

In the present disclosure, if it is judged that the control temperature is below the threshold. value, driving and control of the cooling device by the cooling control unit is executed such as to lower the degree of cooling of the cooling target component by the cooling device below the degree of cooling produced when it is judged that the control temperature is above the threshold value. At this time, since it is a condition that the switching control by the inverter control unit is stopped, the degree of cooling is lowered in a state in which the inverter is not generating heat, or only a small amount of heat. As a result, it is possible to reduce the power consumption of the cooling device while preventing the cooling target component from becoming overheated.

First Embodiment

A first embodiment of a cooling control device according to the present disclosure is described in the following with reference to the drawings. The cooling control device of the present embodiment is mounted on a vehicle such as a hybrid vehicle or an electric vehicle, which uses a rotary electric machine as a power source for propulsion.

As shown in FIG. 1, the vehicle 10 includes a rotary electric machine 20 and an inverter 21. In the present embodiment, the rotary electric machine 20 has three-phase windings and is, for example, a permanent magnet type synchronous machine. The rotor of the rotary electric machine 20 can transmit power to the drive wheels of the vehicle 10. That is, the rotary electric machine 20 serves as a propulsion power source for the vehicle 10.

The inverter 21 is electrically connected to the windings of the rotary electric machine 20. The inverter 21 has switches for the upper and lower arms thereof. Electric power is supplied to the rotary electric machine 20 from a high-voltage storage battery that is electrically connected to the inverter 21, by switching control of the switches of the inverter 21. The high-voltage storage battery is, for example, a lithium-ion storage battery or a nickel-metal hydrogen storage battery.

The vehicle 10 includes a DC-DC: converter 22 and a charger 23, The DC-DC converter 22 steps down the output voltage of the high-voltage storage battery and supplies it to a low-voltage system constituted by a low-voltage storage battery and an electrical load. The charger 23 is electrically connectable to a power supply facility that is provided externally to the vehicle 10. By electrically connecting the external power supply facility and the charger 23, the high-voltage storage battery can be charged from the power supply facility via the charger 23.

The vehicle 10 includes a circulation path 30 in which cooling water circulates, an electric water pump 31 as a cooling device, and a radiator 32. The water pump 31 is supplied with power and driven to circulate the cooling water. The rotary electric machine 20, the charger 23, the DC-DC converter 22, and the inverter 21 are arranged in that order along the circulation path 30, on the downstream side of the water pump 31. However, the order in which the rotary electric machine 20, the charger 23, the DC-DC converter 22 and the inverter 21 are arranged along the circulation path 30 is not limited to the above-described order.

A radiator 32 is provided between the inverter 21 and the water pump 31 in the circulation path 30. The radiator 32 cools the cooling water flowing along the circulation path 30 and supplies it to the water pump 31. The cooling water flowing into the radiator 32 is cooled by airflow from vehicle motion that is blown on the radiator 32 as the vehicle 10 travels, and airflow that is blown on the radiator 32 by driving the radiator fan for rotation.

The vehicle 10 includes a motor temperature sensor 40, an inverter temperature sensor 41, a converter temperature sensor 42, a charger temperature sensor 43, and a cooling water temperature sensor 44. The motor temperature sensor 40 detects the temperature of the rotary electric machine 20 as the motor temperature Tmg. In the present embodiment, the motor temperature sensor 40 detects the temperature of the windings of the rotary electric machine 20 as the motor temperature Tmg. The inverter temperature sensor 41 detects the temperature of the inverter 21 as the inverter temperature Tinv. The converter temperature sensor 42 detects the temperature of the DC-DC converter 22 as the converter temperature Tddc. The charger temperature sensor 43 detects the temperature of the charger 23 as the charger temperature Tcha. The cooling water temperature sensor 44 detects the temperature of the cooling water flowing between the inverter 21 and the radiator 32 in the circulation path 30 as the cooling water temperature Thw.

The vehicle 10 includes a vehicle speed sensor 50 and a brake sensor 51. The vehicle speed sensor 50 detects the travel speed of the vehicle 10. The brake sensor 51 detects the brake stroke Sb, which is the stepping amount of the driver's brake pedal.

The detection values of the sensors 40 to 44, 50, 51 are input to a control unit 60 that is provided in the vehicle 10. The control unit 60 performs switching control of the inverter 21, for driving the rotary electric machine 20 to drive the vehicle 10. Specifically, the control unit 60 performs switching control of the inverter 21 for controlling e torque of the rotary electric machine 20 to a command value of torque Trq* when the vehicle 10 is propelled. The control unit 60 also controls driving of the DC-DC converter 22, charging by the charger 23, and driving of the radiator fan.

The control unit 60 controls driving of the water pump 31 to prevent overheating of the cooling target components, composing of the rotary electric machine 20, the inverter 21, the DC-DC converter 22, and the charger 23. In this control, if the control unit 60 judges there is no possibility that the inverter 21, etc., will be in an overheated state, the water pump 31 is stopped, to reduce power consumption. In the present embodiment, the control unit 60 corresponds to a cooling control unit and to an inverter control unit.

Figure 2:
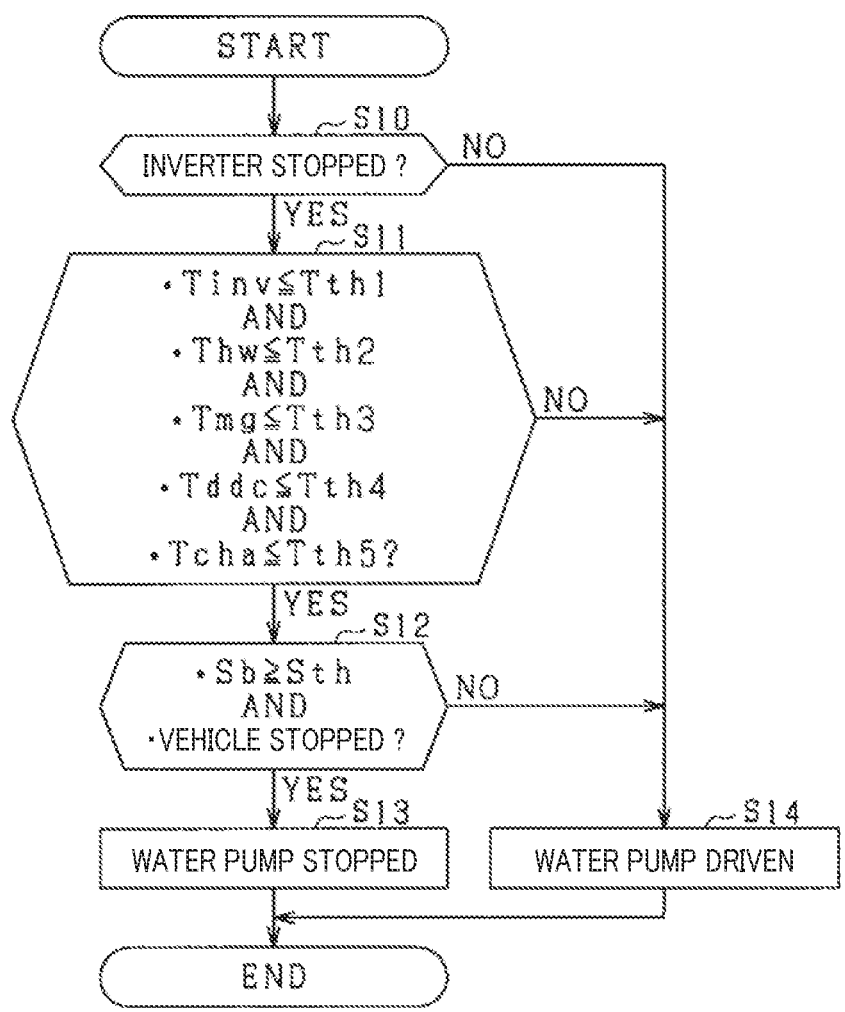
FIG. 2 is a flowchart showing a processing procedure for driving and control of a water pump.

FIG. 2 shows the procedure of a driving and control of process executed by the control unit 60 for the water pump 31. This process is executed repetitively, for example in a predetermined control cycle.

In step S10, a decision is made as to whether the switching control of the inverter 21 is stopped. When the switching control is stopped, no current is flowing through the inverter 21, and the inverter 21 does not generate heat. Hence, it is considered that there is no possibility that the inverter 21 will be in an overheated state.

If a positive decision is made in step S10, the process proceeds to step S11, and a decision is made as to whether each of respective first to fifth temperature conditions are satisfied. The first temperature condition is that the detected inverter temperature Tinv is equal to or less than a first threshold value Tth1. The first threshold value Tth1 is set from the aspect of preventing failure of the inverter 21, and is set, for example, to the allowable upper limit temperature of the inverter 21. The second temperature condition is that the detected cooling water temperature Thw is equal to or less than a second threshold value Tth2. The second threshold value Tth2 is set, for example, to the upper limit value of a temperature range set for the cooling water temperature Thw.

The third temperature condition is that the detected motor temperature Tmg is equal to or less than a third threshold value Tth3. The third threshold value Tth3 is set from the aspect of preventing failure of the rotary electric machine 20, and is set, for example, to the allowable upper limit temperature of the rotary electric machine 20 (specifically, of the windings). The fourth temperature condition is a condition that the detected converter temperature Tddc is equal to or less than a fourth threshold value Tth4. The fourth threshold value Tth4 is set from the aspect of preventing failure of the DC-DC converter 22, and is set, for example, to the allowable upper limit temperature of the DC-DC converter 22. The fifth temperature condition is that the detected charger temperature Tcha is equal to or less than a fifth threshold value Tth5. The fifth threshold value Tth5 is set from the aspect of preventing failure of the charger 23, and is set, for example, to the allowable upper limit temperature of the charger 23. In the present embodiment, the inverter temperature Tinv, the cooling water temperature Thw, the motor temperature Tmg, the converter temperature Tddc, and the charger temperature Tcha correspond to a "control temperature".

If it is judged in step S11 that all the temperature conditions are satisfied, the process proceeds to step S12. In Step S12, a decision is made as to whether both of a first condition and a second condition are satisfied, where the first condition is that the detected brake stroke Sb is equal to or greater than a predetermined stroke Sth, and the second condition is that the vehicle 10 is stopped. The first condition is to enable a decision to be made as whether the driver is performing a braking operation. The decision as to whether the vehicle is stopped may be made based on the detection value from the vehicle speed sensor 50.

If a positive decision is made in step S12, the process proceeds to step S13, and the water pump 31 is stopped. As a result, the circulation of the cooling water in the circulation path 30 is stopped. It is equally possible to stop the radiator fan in step S13.

On the other hand, if a negative decision is made in steps S10, S11, and S12, the process proceeds to step S14, and the water pump 31 is driven. As a result, the cooling water circulates in the circulation path 30, and the rotary electric machine 20, the inverter 21, the DC-DC converter 22, and the charger 23 are cooled.

The driving mode of the water pump 31 will be described with reference to FIG. 3. FIG. 3A shows transition of the travel speed, as detected by the vehicle speed sensor 50, and FIG. 3B shows the transitions of the switching state of the inverter 21. FIG. 3C shows transitions of the temperature of the control target components, and FIG. 3D shows transitions of the driving state of the water pump 31.

Figure 3:
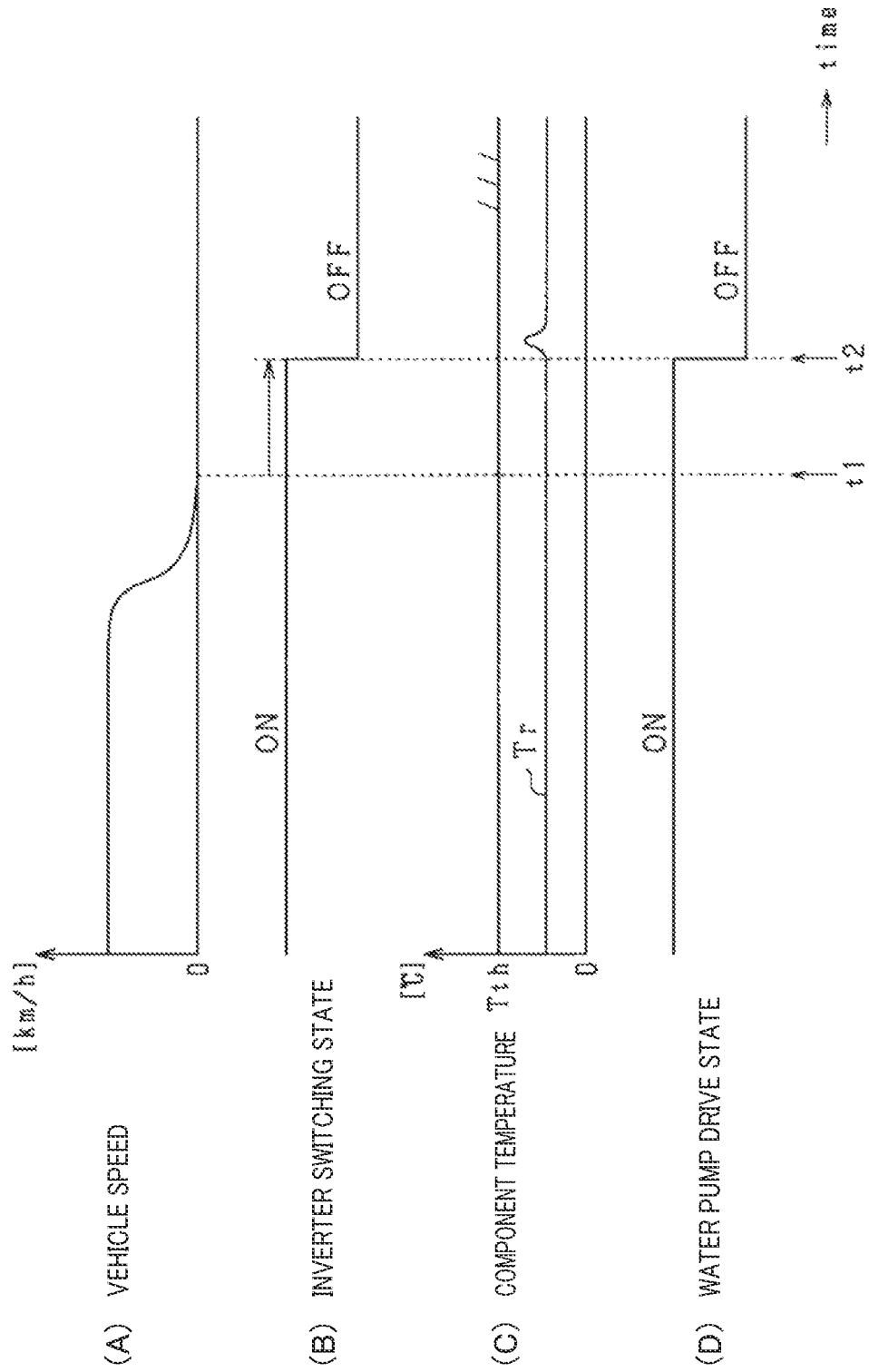
FIG. 3 is a timing chart showing an example of a driving mode of a water pump.

In FIG. 3, for convenience, the rotary electric machine 20, the inverter 21, the DC-DC converter 22, and the charger 23 are collectively regarded as being a single cooling target component. Hence, in FIG. 3C, the first to fourth threshold values Tth1 to Tth4 are simply described as the threshold value Tth, and the temperature of the cooling target component is designated as Tr.

In the period prior to time t1, the driver operates the brake, and the travel speed of the vehicle 10 gradually decreases. The control unit 60 then judges, at time t1, that the travel speed has become 0 (zero), i.e., that the vehicle 10 has stopped. At time t2, after a predetermined time has elapsed from time t1, the control unit 60 stops the switching control of the inverter 21. The control unit 60 then judges that all of the conditions described with reference to FIG. 2 for stopping the water pump 31 are satisfied, and stops the water pump 31.

According to the present embodiment, described in detail above, the following effects can be obtained.

The water pump 31 is stopped on condition that it is judged that the detected inverter temperature Tinv is equal to or less than the first threshold value Tth1 and that the detected motor temperature Tmg is equal to or less than the third threshold value Tth3. At this time, it is also a condition for stopping the water pump 31 that the switching control of the inverter 21 is stopped. Since the switching control of the inverter 21 is stopped, the inverter 21 and the rotary electric machine 20 do not generate heat that is caused by the switching control. Hence, even if the water pump 31 is stopped, there is little possibility that the inverter 21 and the rotary electric machine 20 will be insufficiently cooled.

After the water pump 31 is stopped, the inverter 21 receives heat from the surroundings, and hence it is possible that the inverter temperature Tinv may exceed the first threshold value Tth1. Even in this case, since the first temperature condition is no longer satisfied, the water pump 31 is restarted, so that overheating of the inverter 21 and the rotary electric machine 20 can be prevented. It should also be noted that after the water pump 31 has been stopped, it will be restarted if at least one of the second to fifth temperature conditions ceases to be satisfied.

As described above, according to the present embodiment, it is possible to reduce the power consumption of the water pump 31 while preventing the cooling target components, including the inverter 21 and the rotary electric machine 20, from becoming overheated.

The water pump 31 is stopped on condition that a brake operation of the vehicle 10 is performed. In a situation in which a brake operation is performed, it is not necessary for power to be supplied to the rotary electric machine 20 for generating running torque, and so the level of current flowing through the rotary electric machine 20 is small. In such a situation, there is little need for cooling the cooling target components. Hence, even if the water pump 31 is stopped, there is little possibility that the cooling target components will reach an overheated state. Thus, by including the condition that a brake operation of the vehicle 10 is performed as one of the conditions for stopping the water pump 31, it is possible to accurately specify those situations in which the water pump 31 should be stopped.

The water pump 31 is stopped provided that the vehicle 10 is stopped. A situation in which the vehicle 10 is stopped is one in which no current will be flowing in the rotary electric machine 20, and hence there is little need for cooling the cooling target component. Even if the water pump 31 is stopped in such a situation, there is little possibility that the control target components will become overheated. Hence, by including the condition that the vehicle is stopped as one of the conditions for stopping the water pump 31, it is possible to accurately specify the situations in which the water pump 31 should be stopped.

Second Embodiment

A second embodiment will be described in the following with reference to the drawings, focusing on differences from the first embodiment. In this embodiment, the conditions for stopping the water pump 31 are changed.

Figure 4:
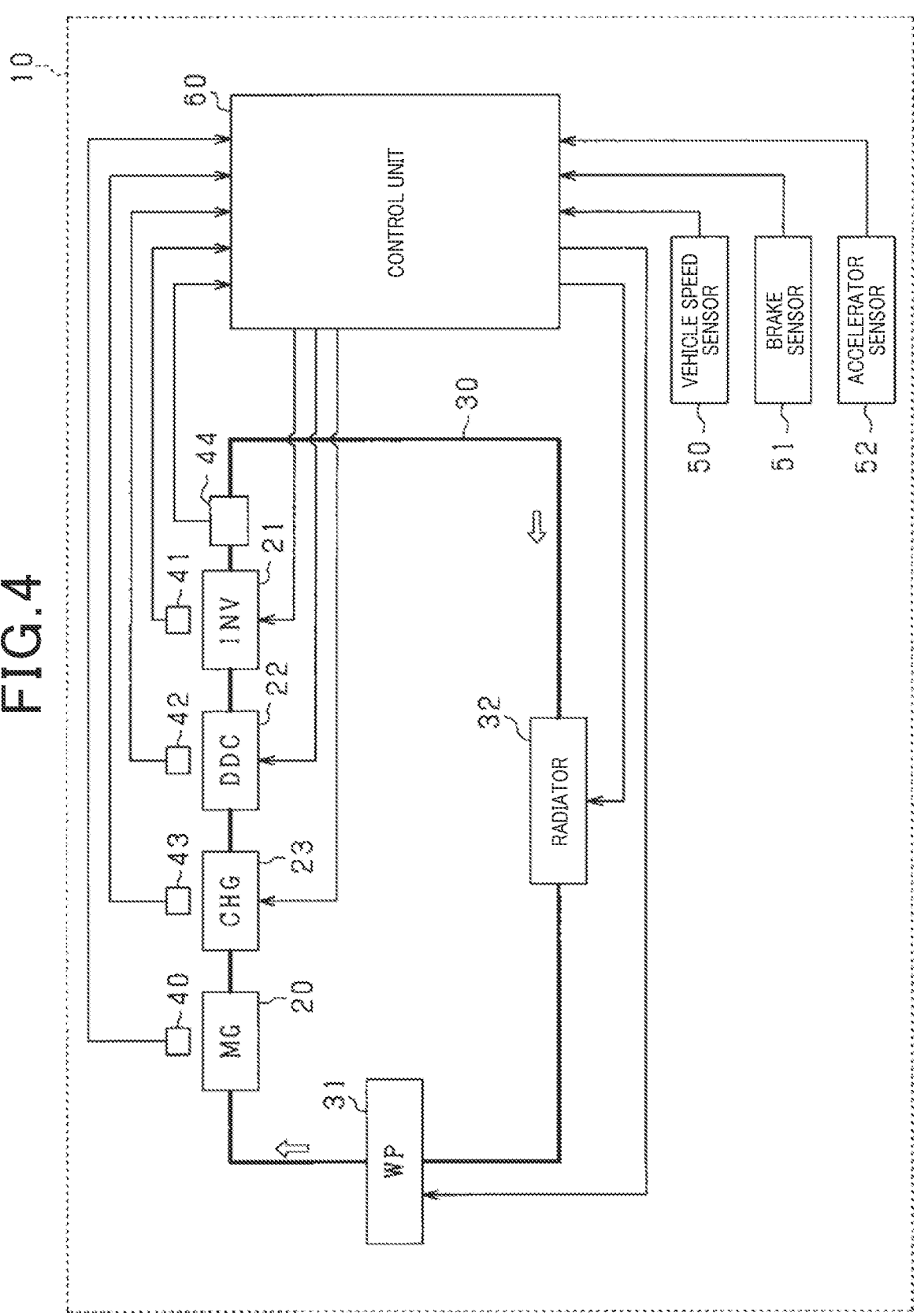
FIG. 4 is an overall configuration diagram of an in-vehicle system according to a second embodiment.

FIG. 4 shows the overall configuration of the system according to the present embodiment. In FIG. 4, items having the same configurations as those shown in FIG. 1 above are designated by the same reference numerals, for convenience.

The vehicle 10 includes an accelerator sensor 52, which detects the accelerator stroke Sa, which is the stepping amount of the accelerator pedal, the accelerator member that is operated by the driver. The detection value from the accelerator sensor 52 is input to the control unit 60.

Figure 5:
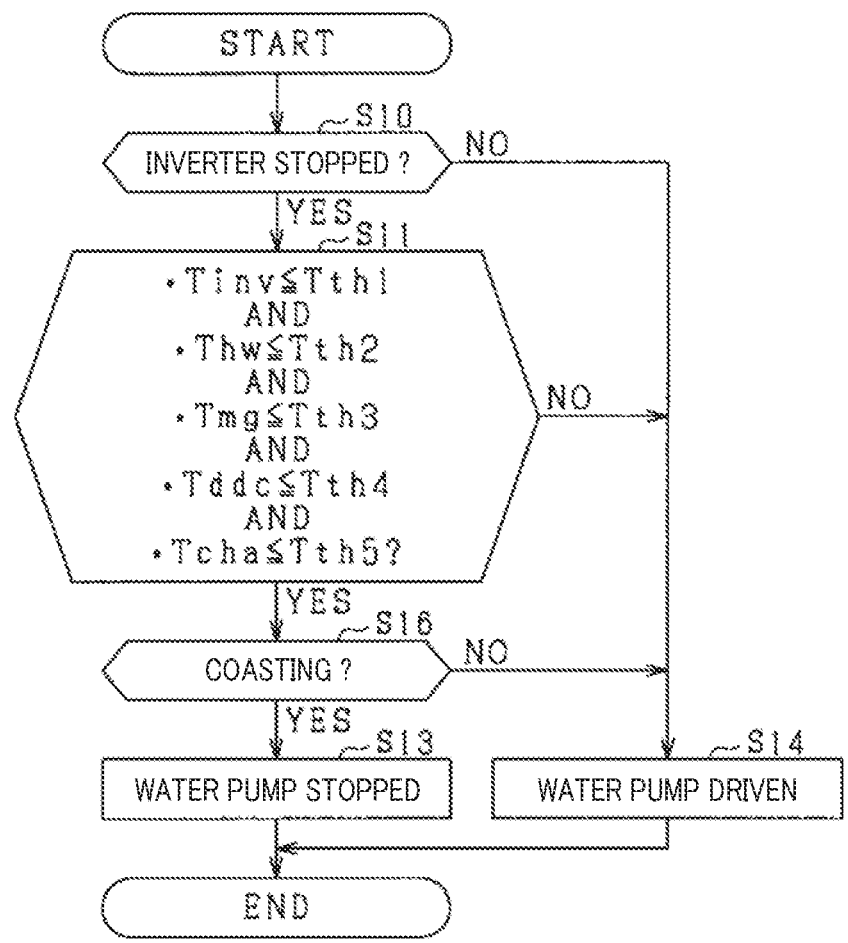
FIG. 5 is a flowchart showing a processing procedure for driving and control of a water pump.

FIG. 5 shows a procedure of driving and control processing executed by the control unit 60 for the water pump 31. This process is repetitively executed, for example at a predetermined control cycle. In FIG. 5, processing which is the same as that shown in FIG. 2 above is designated by the same reference numerals, for convenience.

If a positive decision is made in step S11, the process proceeds to step S16, and a decision is made as to whether the vehicle 10 is in a state of coasting (hereinafter, is coasting). In the present embodiment, if the condition that the vehicle speed detected by the vehicle speed sensor 50 is higher than 0, the condition that an accelerator operation is not being performed, and the condition that the command torque Trq* of the rotary electric machine 20 is less than a torque threshold value are all satisfied, it is judged that the vehicle 10 is coasting. The condition concerning the command torque Trq* is used to judge whether the command torque Trq* is equivalent to 0. Furthermore, the decision as to whether the accelerator is being operated (that is, whether the accelerator pedal is being depressed) is made based on the stepping amount Sa that is detected by the accelerator sensor 52.

If it is judged in step S16 that the vehicle is coasting, the process proceeds to step S13. On the other hand, if it is judged in step S16 that the vehicle is not coasting, it is judged that the driver of the vehicle 10 intends the vehicle 10 to generate drive power for propulsion, and the process proceeds to step S14.

Figure 6:
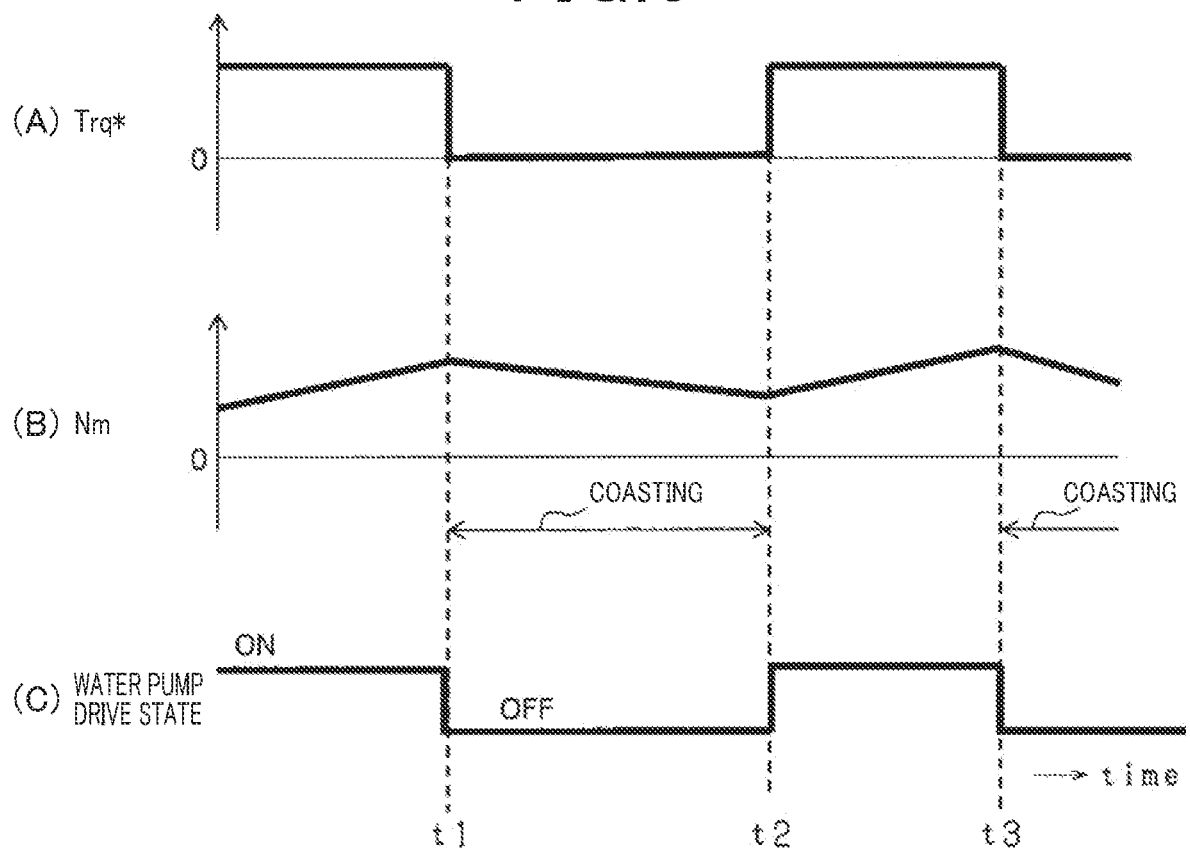
FIG. 6 is a timing chart showing an example of a driving mode of a water pump.

The driving mode of the water pump 31 will be described with reference to FIG. 6. FIG. 6A shows transitions of the command torque Trq*, FIG. 6B shows transitions of the rotation speed of the rotor of the rotary electric machine 20 (hereinafter referred to as the motor rotation speed Nm), and FIG. 6C shows transitions of the driving state of the water pump 31.

In the period prior time t1, the command torque Trq* is set to a value greater than 0, and the vehicle 10 is in the accelerating state. At time t1, it is judged that the vehicle 10 is running, the accelerator is not being operated, and the command torque Trq* is less than the torque threshold value. As a result, it is judged that the vehicle 10 is coasting, and the water pump 31 is stopped.

Subsequently, at time t2, the accelerator operation is restarted, the switching control is restarted, and the vehicle 10 is put into the acceleration state. As a result, the driving of the water pump 31 is restarted. Subsequently at time t3, it is determined that the vehicle 10 is coasting, as in the case of time t1 and the water pump 31 is stopped again.

With the present embodiment described above, the same effects can be obtained as for the first embodiment.

Third Embodiment

A third embodiment will be described in the following with reference to the drawings, focusing on differences from the first embodiment. In this embodiment, the drive load of the water pump 31 is variable, and the flow rate of the cooling water circulating in the circulation path 30 (corresponding to a "degree of cooling") is variable.

Figure 7:
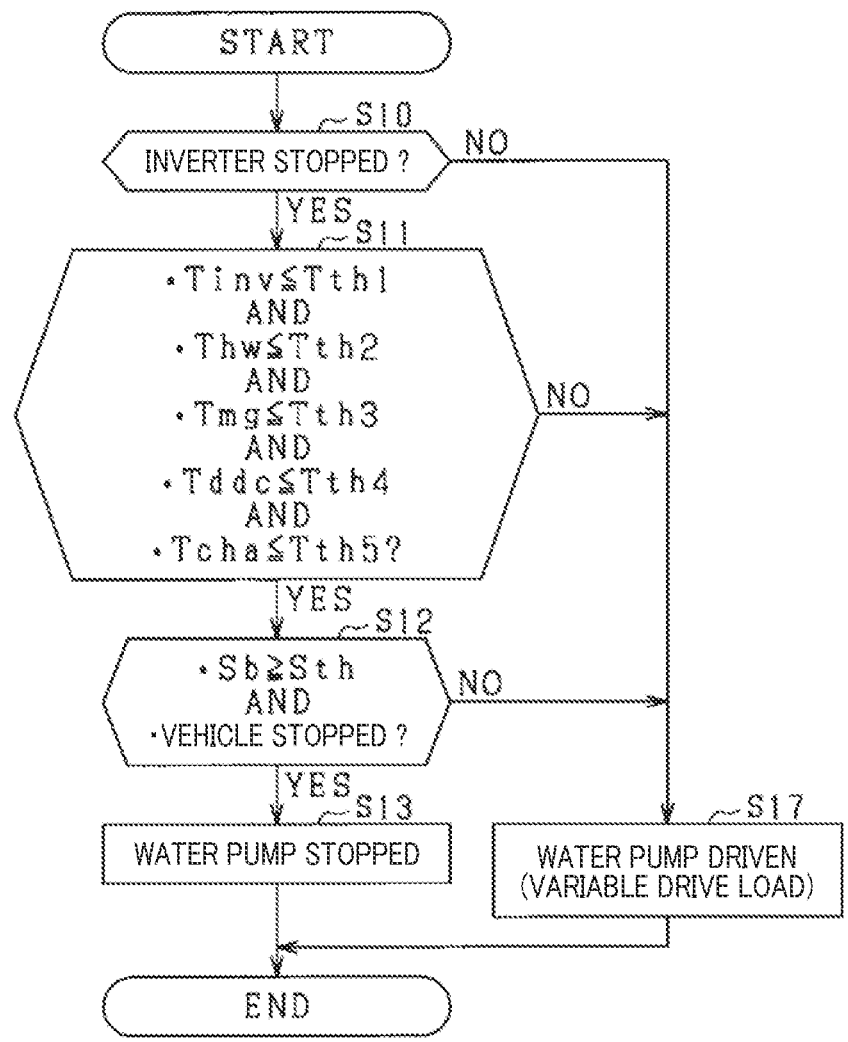
FIG. 7 is a flowchart showing a processing procedure for driving and control of a water pump according to a third embodiment.

FIG. 7 shows a procedure of driving and control processing of the water pump 31 executed by the control unit 60. This process is, for example, repetitively executed at a predetermined control cycle. In FIG. 7, processing which is identical to that shown in FIG. 2 is designated by the same reference numerals, for convenience.

In step S17, the greater the number of temperature conditions that are not satisfied, among the first to fifth temperature conditions described in step S11, the higher is set the command value of the cooling water flow rate. The driving and control of the water pump 31 is performed such that the cooling water flow rate becomes the command value thereof. Thus, the higher the command value of the cooling water flow rate, the greater becomes the drive load of the water pump 31.

It should be noted that the degrees of cooling corresponding to respective conditions may be different from one other. Hence, the command value of the cooling water flow rate may be set, for example, using map information or mathematical expression information which defines command values of the cooling water flow rate in relation to information that specifies which of the temperature conditions are not satisfied.

According to the present embodiment described above, the flow rate of the cooling water circulating in the circulation path 30 can be set to a flow rate that depends upon whether a control target component, such as the inverter 21, is in an overheated state. As a result, the power consumption of the water pump 31 can be reduced while preventing the control target components from becoming overheated.

Fourth Embodiment

A fourth embodiment will be described in the following with reference to the drawings, focusing on differences from the first embodiment. In this embodiment, there is a change in the driving mode of the water pump 31 when the driving is restarted. Specifically, in FIG. 2, in the situation where the water pump 31 has been stopped by the process of step S13, the driving mode of the water pump 31 that is executed in step S14 is changed, if a negative decision has been made in any of steps S10 to S12.

The driving mode of the water pump 31 will be described with reference to FIG. 8. FIG. 8A shows transitions of the command torque Trq*, and FIG. 8B shows transitions of the switching state of the inverter 21. FIG. 8C shows transitions of the temperature of the control target component, and FIG. 8D shows transitions of the driving state of the water pump 31. FIG. 8E shows transitions of the drive load of the water pump 31, and FIG. 8F shows transitions of the flow rate of the cooling water circulating in the circulation path 30.

Figure 8:
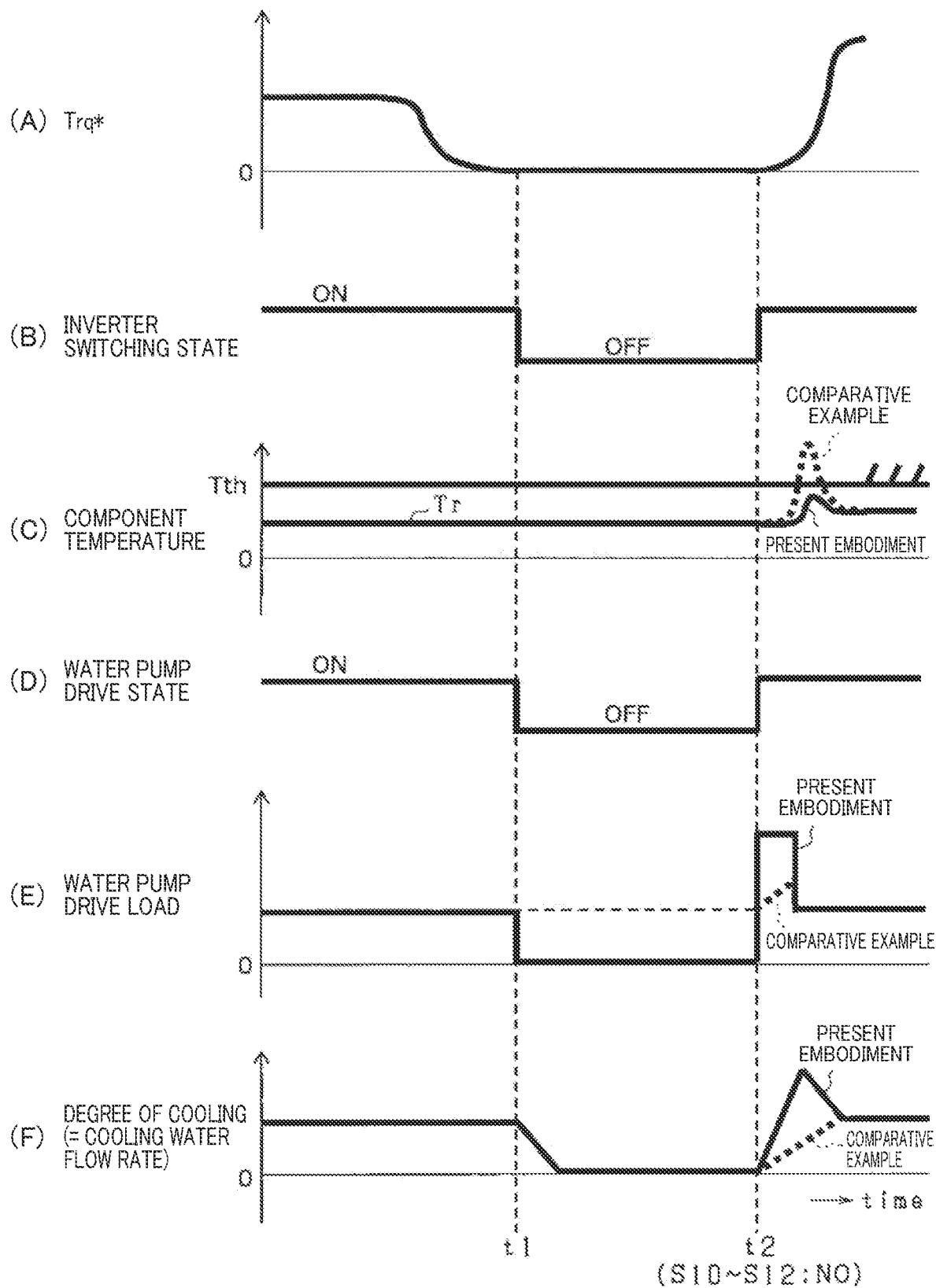
FIG. 8 is a timing chart showing an example of a driving mode of a water pump according to a fourth embodiment.

In FIG. 8, as in FIG. 3, the rotary electric machine 20, the inverter 21, the DC-DC converter 22, and the charger 23 are collectively regarded as a single cooling target component, for convenience. Hence, in FIG. 8C, the first to fourth threshold values Tth1 to Tth4 are simply designated as the threshold value Tth, and the temperature of the control target component is designated as Tr.

In the period prior to time t1, the control unit 60 drives the water pump 31 by the process of step S14. As a result, the cooling water circulates in the circulation path 30. The flow rate of the cooling water circulating in the circulation path 30 before time t1 corresponds to a "first degree of cooling".

At time t1, the control unit 60 makes a. positive decision in each of the steps S10 to S12, and stops the water pump 31 by the process of step S13. As a result, the flow rate of the cooling water circulating in the circulation path 30 is made lower than the flow rate prior to time t1.

Subsequently, at time t2, the control unit 60 makes a negative decision in one of the steps S10 to S12. In the example shown in FIG. 8, the control unit 60 makes a negative decision in step S10, as a result of restarting the switching control of the inverter 21. In that case, the control unit 60 temporarily increases the flow rate of the cooling water circulating in the circulation path 30 to a flow rate that is higher than the flow rate prior to time t1 (corresponding to a "second degree of cooling"), by executing driving and control of the water pump 31. Subsequently, the control unit 60 executes driving and control of the water pump 31 such as to reduce the flow rate of the cooling water circulating in the circulation path 30 to the flow rate prior to time t1.

The reason for using a configuration which temporarily increases the cooling water flow rate is that a response delay occurs between the time of restarting the driving of the water pump 31 and the restoration of normal operation of the cooling function. This response delay occurs, for example, due to a delay in signal communication between the control unit 60 and the water pump 31, or a delay from the time at which cooling water starts to flow through the circulation path 30 until the desired cooling water flow rate is reached.

On the other hand, as shown by the broken-line portions in FIGS. 8C, 8E, and 8F, with a comparative example in which the cooling water flow rate is not temporarily increased, the time until normal operation of the cooling function is reached becomes longer, and the temperature Tr of the control target component rises above the threshold value Tth.

According to the present embodiment described above, after restarting the driving of the water pump 31, the flow rate of the cooling water circulating in the circulation path 30 can be rapidly increased to the flow rate prior to stopping the water pump 31.

Fifth Embodiment

Figure 9:
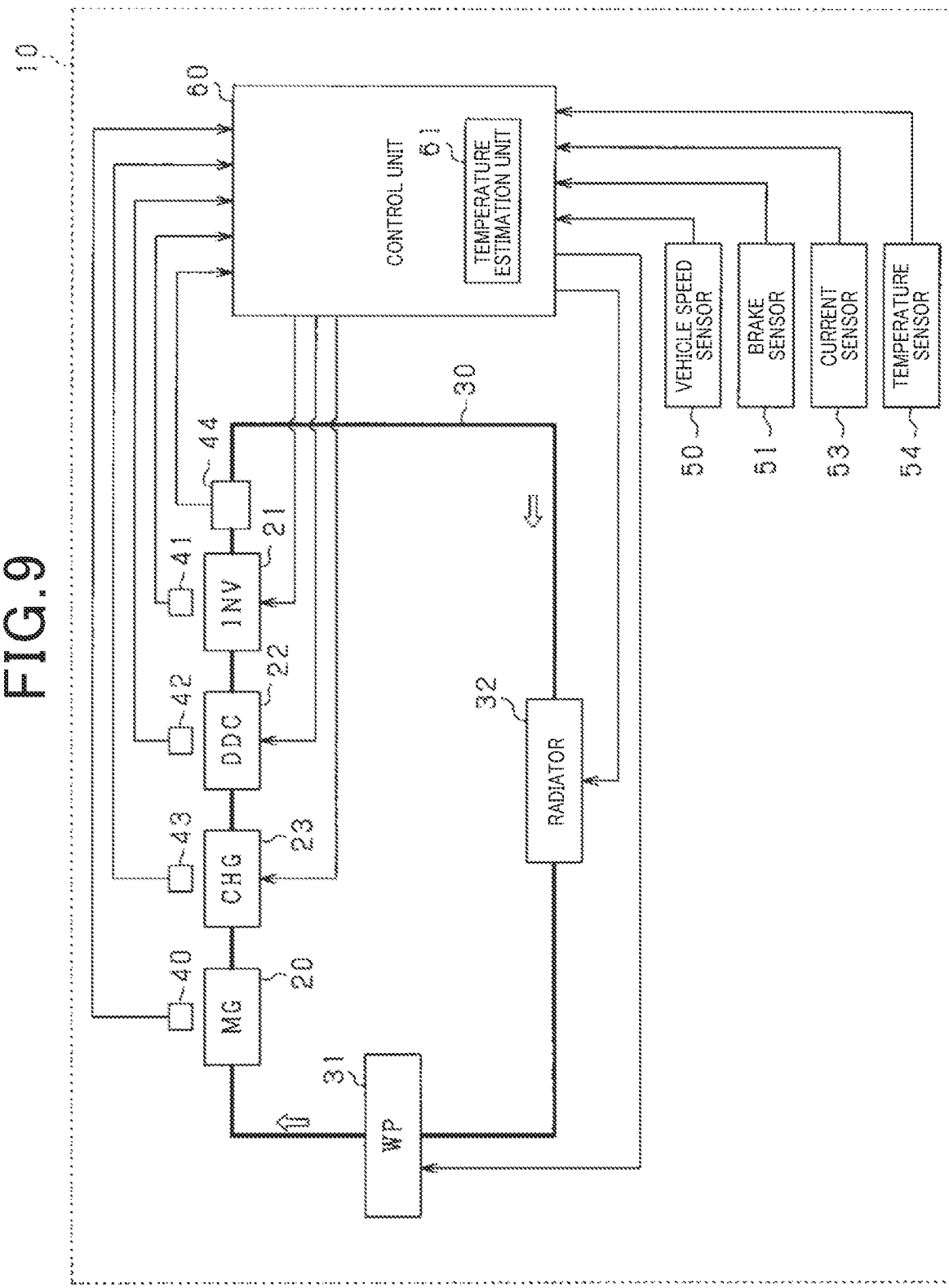
FIG. 9 is an overall configuration diagram of an in-vehicle system according to a fifth embodiment.

A fifth embodiment will be described in the following with reference to the drawings, focusing on the differences from the first embodiment. In this embodiment, as shown in FIG. 9, the control unit 60 includes a temperature estimation unit 61. In FIG. 9, items having the same configurations as those shown in FIG. 1 above are designated by the same reference numerals, for convenience.

The vehicle 10 includes a current sensor 53 and a temperature sensor 54. The detection values of the current sensor 53 and the temperature sensor 54 are input to the control unit 60. In the present embodiment, the temperature sensor 54 is disposed such that the value of correlation between the detected temperature and the temperature of the cooling target component can be obtained. The detected temperature may be, for example, the temperature of the surrounding air outside the vehicle 10, or the temperature in a specific space within the vehicle 10 (for example the engine compartment).

The temperature estimation unit 61 of the control unit 60 calculates an estimated temperature value of the rotary electric machine 20 based on the detection value from the current sensor 53 or the detection value from the temperature sensor 54. The calculated temperature estimate is then used in the process of step S11 in FIG. 2 instead of the motor temperature Tmg. In that case, the current sensor 53 may detect the current flowing through the rotary electric machine 20 (for example, the phase current). Also in that case, the motor temperature sensor 40 is not essential.

The temperature estimation unit 61 calculates an estimated temperature value for the inverter 21 based on the detection value from the current sensor 53, or based on the detection value from the temperature sensor 54. The calculated temperature estimate value is then used in the process of step S11 in FIG. 2, instead of the inverter temperature Tinv. In that case, the current sensor 53 detects the current flowing through the inverter 21, for example. Also in that case, the inverter temperature sensor 41 is not essential.

Similarly, the temperature estimation unit 61 may calculate an estimated temperature value for the DC-DC converter 22 or for the charger 23 based on detection values from the current sensor 53 or based on detection values from the temperature sensor 54. Furthermore, the temperature estimation unit 61 may calculate an estimated temperature value for the cooling water based on detection values from the temperature sensor 54. In the present embodiment, the above-mentioned estimated temperature value corresponds to a "control temperature".

Other Embodiments

Each of the above-mentioned embodiments may be changed and implemented as follows.

In step S12 of FIG. 2, either of the first and second conditions may be omitted. Furthermore, the process of step S12 may be omitted.

The flow rate of discharge from the water pump 31 may be smaller than the flow rate prior to making the positive decision in step S12 of FIG. 2, without stopping the water pump 31 in step S13. Even in that case, the power consumption of the water pump 31 can be reduced.

If there is at least one of the first and third temperature conditions in step S11 of FIG. 2, then part of the five temperature conditions may be omitted.

The positions at which the cooling water temperature is detected in the circulation path 30 are not limited to the positions shown in FIG. 1. For example, the temperature of the cooling water may be detected at a position in the circulation path 30 between the water pump 31 and the rotary electric machine 20.

The cooling device is not limited to a water-cooled device, but may be an air-cooled device such as a fan. In that case, in step S13 of FIG. 2, the fan may be stopped and the airflow rate set to 0.

Furthermore, the cooling device is not limited to being either the water-cooled device or the air-cooled device, and both water-cooled and air-cooled devices may be provided in the system.

The controls and control methods described in the present disclosure may be realized by a dedicated computer, implemented by configuring a processor and memory programmed to perform one or more functions embodied by a computer program. Alternatively, the controls and control methods thereof described in the present disclosure may be implemented by a dedicated computer provided by configuring a processor with one or more dedicated hardware logic circuits. Alternatively, the controls and methods described herein may be realized by one or more dedicated computers, each configured by a combination of a processor and memory programmed to perform one or more functions and a processor configured by one or snore hardware logic circuits. Furthermore, the computer program may be stored in a computer-readable non-transitory tangible recording medium, as instructions to be executed by the computer.

The present disclosure has been described in accordance with respective embodiments, but it is to be understood that the disclosure is not limited to these embodiments and their configurations. The scope of the present disclosure also includes various modifications, and modifications that are within a range of equivalents. In addition, various combinations and forms, including combinations and forms that contain only one element, more or less, come within scope of the present disclosure.

What is claimed is:

1. A cooling control device for application to a system mounted on a vehicle, the system including:
    an inverter;
    a rotary electric machine that is electrically connected to the inverter and is a source of propulsion power for the vehicle on which the system is mounted;
    a brake sensor which detects brake stroke, which is a stepping amount of a driver's brake pedal; and
    a cooling device that cools a cooling target component, which comprises at least one of the inverter and the rotary electric machine, by being supplied and driven with electric power,
    wherein the cooling control device comprises:
        an inverter control unit which executes switching control of the inverter for driving the rotary electric machine; and
        a cooling control unit,
        wherein, on condition (i) that the switching control by the inverter control unit is stopped, (ii) it is determined that the detected brake stroke is equal to or greater than a predetermined stroke, and (iii) it is determined that a control temperature has fallen below a threshold value thereof, where the control temperature is either a detection value from a temperature sensor that detects a temperature of the cooling target component or an estimated value of the temperature of the cooling target component as estimated by a temperature estimation unit, the cooling control unit executes driving and control of the cooling device such as to reduce a degree of cooling of the cooling target component by the cooling device to become lower than the degree of cooling when it is determined that the control temperature is above the threshold value, and
    wherein, while the cooling control unit is executing the driving and control of the cooling device such as to reduce the degree of cooling, and when it is determined that the detected brake stroke is less than the predetermined stroke, the cooling control unit executes the driving and control of the cooling device such as to increase the degree of cooling.

2. The cooling control device according to claim 1, wherein
    the cooling control unit executes the driving and control of the cooling device such as to reduce the degree of cooling on condition that the vehicle is stopped.

3. The cooling control device according to claim 1, wherein:
    in response to determining that the control temperature is higher than the threshold value, the cooling control unit executes the driving and control of the cooling device such that the degree of cooling of the cooling target component becomes a first degree of cooling;
    in response to determining that the control temperature is equal to or lower than the threshold value, the cooling control unit executes the driving and control of the cooling device such that the degree of cooling of the cooling target component becomes lower than the first degree of cooling; and
    while the cooling control unit is executing the driving and control of the cooling device such that the degree of cooling of the cooling target component becomes lower than the first degree of cooling, and when it is determined that the detected brake stroke is less than the predetermined stroke, the cooling control unit executes the driving and control of the cooling device such that the degree of cooling becomes the first degree of cooling, after temporarily making the degree of cooling become a second degree of cooling that is higher than the first degree of cooling.

4. The cooling control device according to claim 1, wherein
    the cooling control unit executes the driving and control of the cooling device such as to reduce the degree of cooling on condition that the vehicle is coasting.

5. The cooling control device according to claim 1, wherein
    while the cooling control unit is executing the driving and control of the cooling device such as to lower the degree of cooling, and either it is determined that the control temperature has become higher than the threshold value or it is determined that switching control of the inverter control unit has restarted, the cooling control unit executes the driving and control of the cooling device such as to increase the degree of cooling.

6. The cooling control device according to claim 5, wherein:
    in response to determining that the control temperature is higher than the threshold value, the cooling control unit executes the driving and control of the cooling device such that the degree of cooling of the cooling target component becomes a first degree of cooling;
    in response to determining that the control temperature is equal to or lower than the threshold value, the cooling control unit executes the driving and control of the cooling device such that the degree of cooling of the cooling target component becomes lower than the first degree of cooling; and
    while the cooling control unit is executing the driving and control of the cooling device such that the degree of cooling of the cooling target component becomes lower than the first degree of cooling, and either it is determined that the control temperature has become higher than the first degree of cooling or it is determined that switching control by the inverter control unit has restarted, the cooling control unit executes the driving and control of the cooling device such that the degree of cooling becomes the first degree of cooling, after temporarily making the degree of cooling become a second degree of cooling that is higher than the first degree of cooling.

7. The cooling control device according to claim 1, wherein the cooling control unit stops the cooling device in response to determining that the detection value from the temperature sensor is equal to or lower than the threshold value.

8. A cooling control device for application to a system mounted on a vehicle, the system including:
an inverter;
a rotary electric machine that is electrically connected to the inverter and is a source of propulsion power for the vehicle on which the system is mounted; and
a cooling device that cools a cooling target component, which comprises at least one of the inverter and the rotary electric machine, by being supplied and driven with electric power,
wherein the cooling control device comprises:
an inverter control unit which executes switching control of the inverter for driving the rotary electric machine; and
a cooling control unit,
wherein, on condition (i) that the switching control by the inverter control unit is stopped, (ii) a braking operation of the vehicle is performed, and (iii) it is determined that a control temperature has fallen below a threshold value thereof, where the control temperature is either a detection value from a temperature sensor that detects a temperature of the cooling target component or an estimated value of the temperature of the cooling target component as estimated by a temperature estimation unit, the cooling control unit executes driving and control of the cooling device such as to reduce a degree of cooling of the cooling target component by the cooling device to become lower than the degree of cooling when it is determined that the control temperature is above the threshold value,
wherein, while the cooling control unit is executing the driving and control of the cooling device such as to reduce the degree of cooling, and when it is determined that a braking operation is not being performed, the cooling control unit executes the driving and control of the cooling device such as to increase the degree of cooling, and
wherein:
in response to determining that the control temperature is higher than the threshold value, the cooling control unit executes the driving and control of the cooling device such that the degree of cooling of the cooling target component becomes a first degree of cooling;
in response to determining that the control temperature is equal to or lower than the threshold value, the cooling control unit executes the driving and control of the cooling device such that the degree of cooling of the cooling target component becomes lower than the first degree of cooling; and
while the cooling control unit is executing the driving and control of the cooling device such that the degree of cooling of the cooling target component becomes lower than the first degree of cooling, and when it is determined that a braking operation is not being performed, the cooling control unit executes the driving and control of the cooling device such that the degree of cooling becomes the first degree of cooling, after temporarily making the degree of cooling become a second degree of cooling that is higher than the first degree of cooling.

9. A cooling control device for application to a system that includes:
an inverter;
a rotary electric machine electrically connected to the inverter; and
a cooling device that cools a cooling target component, which comprises at least one of the inverter and the rotary electric machine, by being supplied and driven with electric power,
wherein the cooling control device comprises:
an inverter control unit which executes switching control of the inverter for driving the rotary electric machine; and
a cooling control unit,
wherein, on condition (i) that the switching control by the inverter control unit is stopped and (ii) it is determined that a control temperature has fallen below a threshold value thereof, where the control temperature is either a detection value from a temperature sensor that detects a temperature of the cooling target component or an estimated value of the temperature of the cooling target component as estimated by a temperature estimation unit, the cooling control unit executes driving and control of the cooling device such as to reduce a degree of cooling of the cooling target component by the cooling device to become lower than the degree of cooling when it is determined that the control temperature is above the threshold value,
wherein, while the cooling control unit is executing the driving and control of the cooling device such as to reduce the degree of cooling, and either it is determined that the control temperature has become higher than the threshold value or it is determined that switching control of the inverter control unit has restarted, the cooling control unit executes the driving and control of the cooling device such as to increase the degree of cooling, and
wherein:
in response to determining that the control temperature is higher than the threshold value, the cooling control unit executes the driving and control of the cooling device such that the degree of cooling of the cooling target component becomes a first degree of cooling;
in response to determining that the control temperature is equal to or lower than the threshold value, the cooling control unit executes the driving and control of the cooling device such that the degree of cooling of the cooling target component becomes lower than the first degree of cooling; and
while the cooling control unit is executing the driving and control of the cooling device such that the degree of cooling of the cooling target component becomes lower than the first degree of cooling, and either it is determined that the control temperature has become higher than the first degree of cooling or it is determined that switching control by the inverter control unit has restarted, the cooling control unit executes the driving and control of the cooling device such that the degree of cooling becomes the first degree of cooling, after temporarily making the degree of cooling become a second degree of cooling that is higher than the first degree of cooling.

\* \* \* \* \*